United States Patent [19]

Segransan et al.

[11] 4,244,894
[45] Jan. 13, 1981

[54] PROCESS AND APPARATUS FOR THE MANUFACTURE OF FILMS BY ELECTROSTATIC APPLICATION

[75] Inventors: Michel Segransan, St. Maurice de Beynost; Jean-Claude Joly, Fontaines sur Saone, both of France

[73] Assignee: Societe la Cellophane, Paris, France

[21] Appl. No.: 5,492

[22] Filed: Jan. 22, 1979

[30] Foreign Application Priority Data

Jan. 25, 1978 [FR] France .................................. 78 01981

[51] Int. Cl.³ .............................................. B29D 7/02
[52] U.S. Cl. ....................................... 264/22; 361/234; 425/174.8 E
[58] Field of Search ........................... 264/22, 24, 216; 425/174.8 E; 361/234

[56] References Cited

U.S. PATENT DOCUMENTS

| | | | |
|---|---|---|---|
| 3,427,686 | 2/1969 | Busby | 264/24 |
| 3,660,549 | 5/1972 | Hawkins | 264/22 |
| 3,820,929 | 6/1974 | Busby et al. | 425/174.8 E |

FOREIGN PATENT DOCUMENTS

| | | | |
|---|---|---|---|
| 1923098 | 2/1971 | Fed. Rep. of Germany | 264/22 |
| 2216621 | 8/1974 | France . | |
| 48-29311 | 9/1973 | Japan | 264/216 |

*Primary Examiner*—James B. Lowe
*Attorney, Agent, or Firm*—Sherman & Shalloway

[57] ABSTRACT

Process and apparatus for electrostatically pinning a dielectric film to a moving surface which is electrically conducting and connected to a grounded fixed potential comprising a corona wire fed with a direct current and a semi-cylindrical metal counter-electrode connected to a potential which is approximately equal to the potential of the moving surface.

When extruding a molten mass of polymer onto a cooling surface, a substantial increase in the speed of application is observed. The best results are obtained when the radius of the counter-electrode is approximately equal to the distance between the corona wire and the moving surface.

15 Claims, 5 Drawing Figures

PROCESS AND APPARATUS FOR THE MANUFACTURE OF FILMS BY ELECTROSTATIC APPLICATION

BACKGROUND OF THE INVENTION

1. Field of the Invention

The present invention relates to a process for electrostatically pinning a dielectric film to a moving surface which is electrically conducting and connected to a fixed potential, the film being applied to the moving surface with the aid of a corona electrode consisting of a metal wire fed with a direct current, the electrode being arranged parallel to the said surface, and a second uninsulated electrode being arranged near and parallel to the corona electrode and perpendicular to the direction of forward movement of the dielectric film.

2. Description of the Prior Art

The process for electrostatically pinning a dielectric film is described in U.S. Pat. No. 3223757. The corona electrode is subjected to a high voltage causing the ionization of the air in the region around the wire. The ions of the same sign as that of the voltage applied to the wire are strongly attracted towards the grounded cooling surface and deposit on the film, which causes the latter to be attracted and applied to the cooling surface. However, it was observed that the speed of application of the molten web to the cooling surface is restricted by the appearance of microbubbles of air between the web and the cooling surface, which leads to a heterogeneity in the appearance of the film. An attempt was then made to overcome this disadvantage by increasing the voltage of the corona wire, but the appearance of electric arcs, as soon as the breakdown voltage of the dielectric situated between the corona electrode and the cooling surface is reached, rapidly restricts this voltage increase.

It was then proposed, in U.S. Pat. No. 3,427,686, to bring the cooling surface to a potential between the value of the corona electrode potential and ground potential, so as to maintain a sufficiently high field between the electrode and the drum, allowing the attraction of the ions emitted by the corona electrode. The risk of disruptive discharge between the electrode and the drum is thus avoided, without substantially increasing the speed of application.

More recently, it was proposed, in U.S. Pat. No. 3,655,307, to provide the corona electrode with a grounded metal counter-electrode being covered with an insulating layer which prevents the formation of electrical discharges between the two electrodes and made it possible to apply an exceptionally high voltage to the corona wire without interruption of the application force due to disruptive discharges. The ions attracted towards the counter-electrode by ground potential retain their charges and deposit on the insulating surface which thus becomes positively charged and then repels the positive ions generated by the corona electrode; this produces the effect of focusing the ions towards the molten web. The intensity of the corona current is increased by injecting a gas in the region of the corona electrode. An improvement in the speed of application of the molten web to the cooling surface is thus achieved. However, a device of this kind exhibits disadvantages: the voltage to which the corona electrode is subjected is high and the counter-electrode must be protected by a strong dielectric material in order to avoid electric arcs between the electrode and the counter-electrode. Furthermore, in order to prevent the formation of an electric arc between the cooling drum and the corona electrode, without increasing the distance between the two, it is necessary to inject a gas of high dielectric strength in the region of the corona electrode. Because of such constraints, a device of this kind is rather difficult to produce and is relatively expensive.

Another simpler solution was proposed in U.S. Pat. No. 3,820,929, which describes a device comprising a corona electrode and a second electrode, arranged near the corona electrode, these two electrodes being subjected to the same potential, one of them having a small diameter and ionizing the air which surrounds it, and the second being of larger diameter and having no ionizing action on the ambient medium. Since this second electrode is at a positive potential, it strongly repels the positive ions towards the grounded cooling drum, causing these ions to focus towards the molten mass, which improves the application of the molten mass to the drum.

However, a device of this kind presents dangers from the point of view of safety in industrial use, because of the high voltage present on this counter-electrode. Furthermore, the improvement in the performance is small as compared to the device having a single wire.

SUMMARY OF THE INVENTION

The invention makes it possible to avoid the disadvantages of the processes and devices described above.

It relates to a process for electrostatically pinning a dielectric film to an electrically conducting moving surface which is connected to a fixed potential, the film being applied to the moving surface with the aid of a corona electrode consisting of a metal wire which is arranged parallel to the surface and fed with direct current, and a second electrode being arranged near the corona electrode and parallel to the latter, characterized in that the second electrode is a counter-electrode of semi-cylindrical shape, which is made of an electrically conducting material, is electrically uninsulated and is connected to a fixed potential which is approximately equal to the potential of the moving surface, the concave face of the counter-electrode being located in front of the corona electrode so that an electric current can be established between the corona electrode and the counter-electrode.

According to a preferred embodiment, the process according to the invention is characterized in that the moving surface is connected to ground.

A process of this kind is applied particularly to the application of a molten web to a cooling surface, i.e., for electrostatic pinning of polyethylene terephthalate molten web on a quenching drum.

In contrast to the teaching of the abovementioned patents, and in particular U.S. Pat. Nos. 3,655,307 and 3,820,929, it has been found that the presence of a conducting counter-electrode, which is uninsulated and connected to a potential which is approximately equal to earth potential, would make it possible to obtain excellent results and improve the speed of pinning a film, in particular in the case of extrusion and pinning of a molten web onto a cooling surface. In fact, apart from the disadvantages of its operation, the device described in U.S. Pat. No. 3,655,307 requires the use of an insulated counter-electrode in order to obtain the speeds of application given in the illustrative embodiments. In view of the experimental results given in the illustrative embodiments falling within the scope of the present invention, it will be possible to appreciate that the results obtained are superior without insulation of the counter-electrode (simplicity of production) and when using a voltage for feeding the corona wire which can vary between 2 kV and 30 kV but which gives excellent results when it is of the order of 5 kV (substantially lower voltage, avoiding the risk of disruptive discharges).

Similarly, U.S. Pat. No. 3,820,939 describes a device in which the second electrode performs the function of repelling the ions emitted by the first electrode, in order to focus them onto the molten web. In these two patents, it is considered to be a necessary measure to prevent the positive ions from being captured by a surface at ground potential, which is other than the moving surface located under the molten web. In contrast, within the scope of the present invention, some of the positive ions generated by the corona electrode are attracted by the counter-electrode, and this causes an appreciable increase in the current of the corona electrode, at a constant corona potential; it is thus surprising to find that the increase in this current undoubtedly places the corona emitter under better conditions for ionization of the atmosphere. The loss of positive ions, due to the presence of the uninsulated counter-electrode, is very much smaller than the increase in the emission of positive ions by the corona electrode. It appears that these surplus positive ions are attracted by the moving surface and thus cause an improved pinning of the molten web.

It is obvious that the invention also applies in the case where the moving surface is connected to a fixed potential which is different from ground potential. In this case, the counter-electrode will itself be connected to a potential which is approximately equal to this fixed potential.

The corona electrode used within the scope of the present invention can be produced from any suitable metal conductor which is well known to those skilled in the art; copper, stainless steel, tungsten, gold, chromium, alloys of these metals or a combination of these metals may be mentioned without implying a limitation. For greater details concerning these electrodes, reference can be made to the abovementioned patents and also to U.S. Pat. No. 3,233,757 incorporated herein by reference. When the process according to the invention is used for applying a molten web to a cooling surface, the proximity of the extrusion die causes a deposition of material on the corona electrode by condensation; this material consists of decomposition products of the extruded polymer and volatile products used in the manufacture of the molten web (plasticizers, anti-static agents and the like). In order to ensure correct functioning of the corona electrode, it will be possible, for example, to heat it in accordance with U.S. Pat. No. 3,520,959, incorporated herein by reference, or to ensure continuous travel of the corona wire in accordance with U.S. Pat. No. 3,470,274, incorporated herein by reference.

The counter-electrode used in the device according to the invention is a counter-electrode having the shape of a hollow half-cylinder and made of an electrically conducting material. Preferably, a metal will be chosen from those mentioned above for the corona electrode. In order that the counter-electrode remains uninsulated during the extrusion of a molten web onto a cooling drum it is important and preferred that the volatile products present in the composition of the web, and also the decomposition products of these volatile products, do not deposit on the counter-electrode. In this case, in order to prevent the condensation of these products on the latter, it should be heated to a temperature which is greater than the maximum condensation temperature of the products generated by the extrusion of the plastic. This heating, which is in the field of the expert, can be carried out by any suitable means (Joule's effect).

In the manufacture of polyethylene terephthalate films, this temperature will be above 315° C. At this temperature, the metal forming the counter-electrode oxidizes readily. According to a characteristic of the invention, the counter-electrode is covered, at least over its concave part, with a coating which cannot be oxidized at these temperatures. For this purpose, either the counter-electrode will be made of nickel, chromium or the like, or the counter-electrode will be made of a metal which is covered with a layer of one of these metals deposited electrolytically, chemically or in a like manner.

The geometry of the device, according to the invention, is also of considerable importance with respect to the results obtained. In order to obtain the best results with a corona electrode by itself, it is well known that it is possible to place the electrode at a distance varying between 1 mm and 50 mm from the web, and preferably between 3 mm and 15 mm, the minimum distance being a function of the voltage applied to the corona electrode. It has been found that the best results are obtained when the internal radius of the counter-electrode is approximately equal to the distance separating the dielectric film (or the molten web) from the corona electrode, the latter being arranged along the axis of the counter-electrode. The radius of the counter-electrode will, therefore, preferably have a value between 3 mm and 15 mm. However, it is possible to operate with counter-electrodes having a larger radius of the order of 3 times the distance separating the corona electrode from the dielectric film, while still obtaining excellent results. The orientation of the counter-electrode relative to the corona electrode is also of importance. In order to ensure a degree of symmetry of the electric field, the counter-electrode will preferably be arranged symmetrically relative to the plane which is normal to the moving surface and passes through the corona electrode. Depending on the particular case, it will be possible to vary this orientation within limits which are such that the counter-electrode remains at a distance which is greater than or equal to half the distance between the corona wire and the dielectric film.

The process and device according to the invention can be applied to the pinning, to a conducting surface, of dielectric films (for example, in order to carry along or stretch the latter in the manner described in U.S. Pat. No. 3,068,528), such as films of thermoplastic organic polymers, among which there may be mentioned without implying a limitation, films of polyesters (polyethylene terephthalate), films of polyolefins (polyethylene, polypropylene and the like) and films of polymers, cellulose esters and ethers, polymers of styrene and their copolymers, polycarbonates, polyvinyl choloride and the like. The process and device according to the invention is applied particularly to the application of films of crystalline polymers, on leaving the die, to the quenching surfaces intended to cool the molten web rapidly to below the glass transition temperature of the polymer, in order to reduce the crystallization of the polymer to a minimum. The device according to the invention can also be applied to the application of dielectric films in certain operations for the coating or printing of paper, cellulose film, films of heat-stable resins (polyimides) and the like.

BRIEF DESCRIPTION OF THE DRAWINGS

The invention will be more clearly understood with the aid of the following illustrative embodiments which are given without implying a limitation, together with the figures which show.

DETAILED DESCRIPTION OF THE INVENTION

Figure 1:
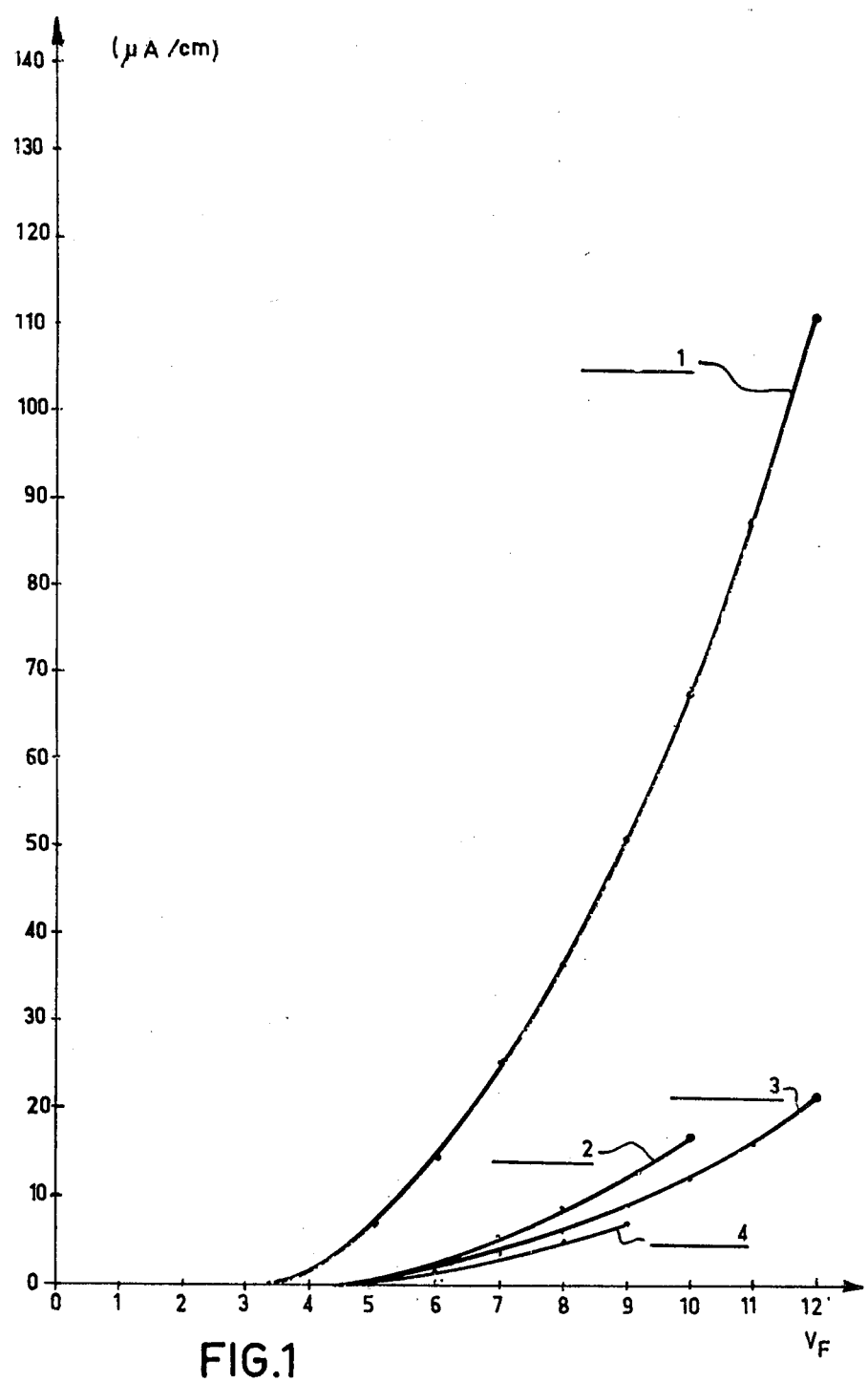
FIG. 1 is a graph of curves showing the variation in the corona electrode current as a function of the applied potential, in various electrode configurations.

FIG. 1 shows four curves of the variation in the current intensity of a corona wire of 75 microns diameter, which is placed 10 mm from a polyethylene terephthalate dielectric film traveling at a speed of 50 meters per minute in front of the corona wire, the back of the dielectric film being in contact with a grounded metal surface. Curve 1 shows the variation in the corona current as a function of the voltage at the terminals of the wire, in the case wherein the wire is provided with a metal counter-electrode according to the invention. In this actual example, the counter-electrode was made of brass and its internal diameter was 20 mm, the corona wire being arranged along the axis of the cylinder.

Curve 2 shows the variation in the corona current as a function of the voltage at the terminals of a wire provided with a counter-electrode which is identical to that above but is covered on the inside with a 2 mm insulating layer of polytetra-fluoroethylene (in accordance with the teaching of U.S. Pat. No. 3,655,307).

Curve 3 shows the case of the wire by itself, without a counter-electrode.

Curve 4 shows the case of a wire provided with an insulating counter-electrode such as that described in French Pat. No. 2,306,064.

It is observed that the current intensity of the corona wire associated with a counter-electrode according to the invention (curve 1) is substantially higher than in all the other cases. This observation appears to be logical, since the ions can also flow through the counter-electrode, which is not possible in the configuration relating to curves 2, 3 and 4.

Figure 2:
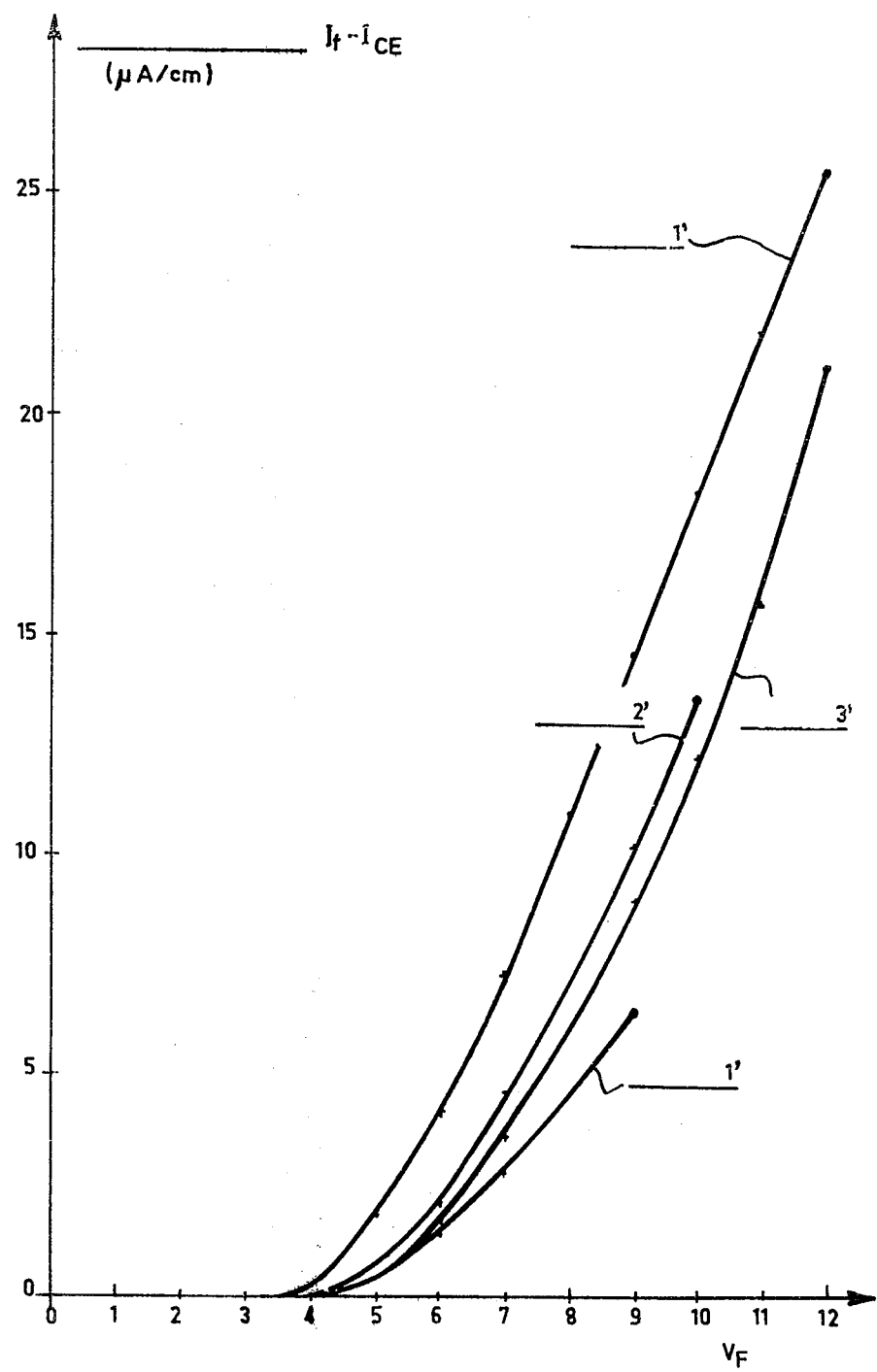
FIG. 2 is a graph of curves showing the amount of ions directed towards the dielectric film, in the various configurations of FIG. 1.

On the other hand, the results shown in FIG. 2 are much more surprising. FIG. 2 shows the voltage ($V_F$) of the corona wire on the abscissa and, on the ordinate, the difference between the current circulating in the corona wire ($I_f$) and the current circulating in the counter-electrode ($I_{CE}$), when using a configuration with a counter-electrode. Curve 1' shows the case of the device according to the invention (electrode +metal counter-electrode), curve 2' shows the case of the insulated metal counter-electrode, curve 3' shows the base of the corona wire by itself and curve 4' shows the case of the corona wire associated with a completely insulating counter-electrode. The method of operation and the conditions are the same as in the case of FIG. 1. It is observed that, surprisingly, the difference between these two currents (which approximately represents the flow of ions towards the dielectric film) is substantially greater in the case of the device according to the invention than in the other cases, regardless of the voltage. In particular, for a voltage of 6 kV, the ion current flowing towards the film for the device according to the invention is twice the ion current for the device with an insulated metal counter-electrode. Likewise, for a voltage of 8 kV, a relative gain in current of 50% is observed.

Furthermore, the corona phenonmenon is much more stable above a certain current for a given voltage (zone referred to as "glow discharge zone"). With the device of the invention, the current falls within this particular zone, which is very advantageous.

Table I summarizes the variations in current as a function of the voltage shown in FIGS. 1 and 2. In the case shown in FIG. 2 by curve 2', the experiment was carried out with a semi-cylindrical counter-electrode of 10 mm diameter, which was coated on the inside with 2 mm of an insulating material, such as polytetrafluoroethylene (PTFE). This insulating layer ended about 2 mm from the ends of the semi-circle (counter-electrode seen in section). The fact that these ends are not completely insulated explains the increase in the current of the corona wire.

TABLE I

| High-voltage electrode potential $V_F$(kV) | 5 | 6 | 7 | 8 | 9 | 10 | 11 | 12 | 13 |
|---|---|---|---|---|---|---|---|---|---|
| WIRE + GROUNDED CONDUCTING COUNTER-ELECTRODE | | | | | | | | | |
| $I_f$(μA/cm) curve 1 | 6.7 | 14.6 | 25.5 | 36.4 | 50.9 | 67.3 | 87.3 | 110.9 | |
| $I_{counter-electrode}$ (μA/cm) | 4.9 | 10.4 | 18.2 | 25.5 | 36.4 | 49.1 | 65.5 | 85.5 | sparking |
| $I_f$-$I_{counter-electrode}$ (μA/cm) | 1.8 | 4.2 | 7.3 | 10.9 | 14.5 | 18.2 | 21.8 | 25.4 | |
| WIRE + CONDUCTING COUNTER-ELECTRODE COVERED WITH AN INSULATOR | | | | | | | | | |
| $I_f$(μA/cm) curve 2 | 0.9 | 2.6 | 5.3 | 8.6 | 12.0 | 16.4 | | | |
| $I_{counter-electrode}$ (μA/cm) | 0.2 | 0.4 | 0.7 | 1.5 | 1.8 | 3.0 | | sparking | |
| $I_f$-$I_{counter-electrode}$ (μA/cm) curve 2' | 0.7 | 2.2 | 4.6 | 7.1 | 10.2 | 13.4 | | | |
| WIRE BY ITSELF | | | | | | | | | |
| $I_f$(μA/cm) curves 3 | 0.4 | 1.6 | 3.6 | 6.0 | 8.9 | 12.2 | 15.6 | 20.9 | sparking |

TABLE I-continued

| High-voltage electrode potential $V_F$ (kV) | 5 | 6 | 7 | 8 | 9 | 10 | 11 | 12 | 13 |
|---|---|---|---|---|---|---|---|---|---|
| and 3' WIRE + INSULATING COUNTER-ELECTRODE | | | | | | | | | |
| $I_f$ (μA/cm) curves 4 and 4' | 0.4 | 1.5 | 2.7 | 4.6 | 6.4 | | sparking | | |

Figure 3:
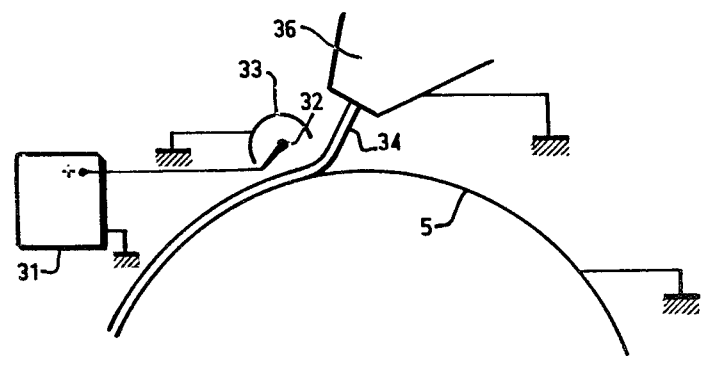
FIG. 3 is a diagram of a device according to the invention, applied to the application of a molten web.
Figure 5:
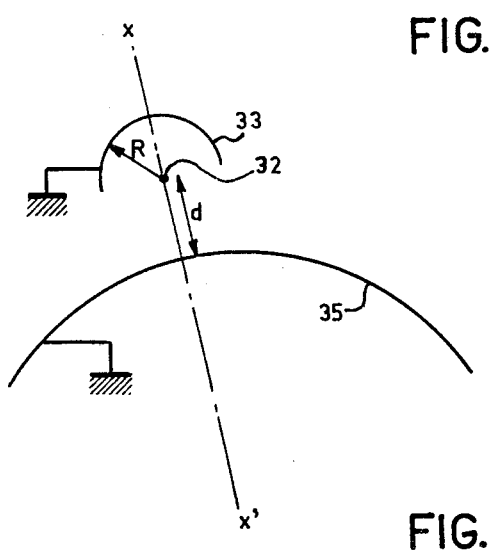
FIG. 5 is a diagram of an electrode/counter-electrode assembly according to the invention.

FIG. 3 schematically represents an installation for applying a film of thermoplastic material leaving the die. A high constant voltage generator 31 is connected to a corona wire 32 provided with a counter-electrode 33 according to the invention, which is connected to ground. A critical feature of the invention is the counter-electrode 33 which is shaped to partially enclose the corona electrode 32. Preferably, the counter-electrode 33 has a concave face which is in front of the corona electrode. As shown in FIGS. 3 and 5, the counter-electrode may be semi-cylindrical and is arranged along the axis of the corona wire. As will be shown below, the radius of the counter-electrode should be approximately equal to the distance between the corona electrode 32 and the moving surface 5. As can be appreciated from FIGS. 3 and 5, the counter-electrode is located at a distance from the moving surface which is greater than or equal to half the distance separating the corona electrode and the moving surface. These critical dimensions will be developed in more detail below. The film 34 issuing from the die 36 is applied to the grounded metal drum 35 by the action of the positive ions generated by the corona wire 32.

Figure 4:
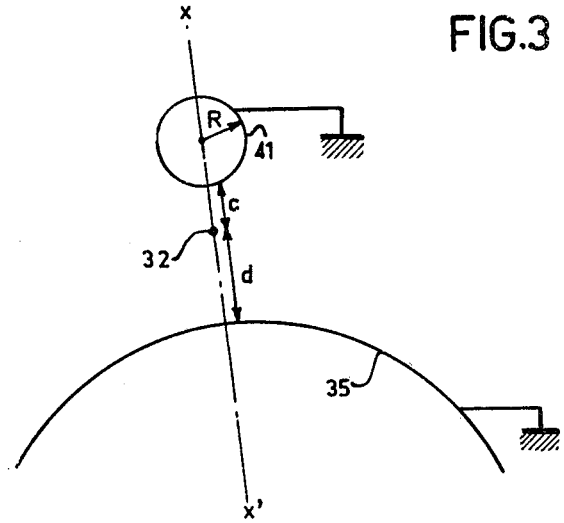
FIG. 4 is a diagram of an electrode/counter-electrode assembly known from the prior art.

FIGS. 4 and 5 show the necessary components of other, different embodiments. (The same elements carry the same references). In FIG. 4, a cylindrical counter-electrode 41 of radius R, which is connected to ground, was used, the corona wire 32 being arranged, respectively, at a distance c from the counter-electrode 41 and at a distance d from the surface 35 of the drum, all the elements being arranged symmetrically relative to the axis XX' (arrangement of U.S. Pat. No. 3,820,920). In FIG. 5, a counter-electrode 33 of semi-cylindrical shape and radius R has been used, the corona wire being arranged along the axis of the cylinder 33 at a distance d from the casting drum 35. The counter-electrode 33 and the drum 35 are connected to ground. The following examples provide a better understanding of the invention:

EXAMPLE 1

A polyethylene terephthalate web, having a thickness of 120 microns and a width of 65 cm, is extruded onto a quenching drum cooled to 40° C.

The electrode used is made of a stainless steel wire of 0.15 mm diameter and is arranged parallel to the drum connected to ground, 6 mm from its surface, so as to obtain the best possible application. A constant voltage is applied to the electrode and increased until the first sparks appear between the electrode and the drum. The speed of the drum is increased and the position and the voltage applied to the electrode are modified in order to maintain a correct application to the drum. The thickness of the web is kept constant by increasing the output of the extruder. The maximum speed which it is possible to reach without the formation of optical defects on the web by trapping air between the surface of the web and the surface of the quenching drum, and without the formation of sparks, is noted.

The maximum speed of the drum is 26.7 meters/minute.

EXAMPLE 2 to 5

The procedure of Example 1 is repeated, but the bare metal wire is replaced by the electrode/counter-electrode assembly as represented schematically in FIG. 4 (device of the prior art). The wire of 0.15 mm diameter is kept 6 mm from the drum (d=6 mm). The chromium-plated steel counter-electrode used is a cylinder of radius 6 mm. The distance c between the electrode and the counter-electrode is successively fixed at 7 mm, 6 mm, 5 mm and 4 mm.

The maximum speeds obtained are shown in Table II.

TABLE II

| Example | Distance c between electrode and counter-electrode | Maximum speed |
|---|---|---|
| 2 | 7 mm | 32.5 meters/minute |
| 3 | 6 mm | 30 meters/minute |
| 4 | 5 mm | 31 meters/minute |
| 5 | 4 mm | 26 meters/minute |

EXAMPLE 6

The procedure of Example 1 is repeated, the bare metal wire being replaced by the electrode/counter-electrode assembly as represented schematically in FIG. 5 (device according to the invention). The wire of diameter 0.15 mm is kept 6 mm from the drum. The counter-electrode used is a chromium-plated steel half-tube of internal radius 6 mm.

The maximum speed obtained is 42 meters/minute.

EXAMPLE 7

The procedure of Example 1 is repeated, the bare metal wire being placed 4 mm from the surface of the drum (metal wire by itself).

The maximum speed obtained is 36.5 meters/minute.

EXAMPLES 8 to 11

The procedure of Examples 2 to 5 is repeated, the wire being placed 4 mm from the drum (device of FIG. 4, according to the prior art).

The maximum speeds obtained are shown in Table III.

TABLE III

| Example | Distance c between electrode and counter-electrode | Maximum speed |
|---|---|---|
| 8 | 7 mm | 38.5 meters/minute |
| 9 | 6 mm | 36 meters/ |

TABLE III-continued

| Example | Distance c between electrode and counter-electrode | Maximum speed |
| --- | --- | --- |
| 10 | 5 mm | 36 meters/minute |
| 11 | 4 mm | 38 meters/minute |

EXAMPLE 12 to 14

The procedure of Example 6 is repeated, the wire being placed 4 mm from the drum. Furthermore, counter-electrodes in the shape of a half-tube, having internal radii of 6.5 and then 4 mm, are tested successively (device of FIG. 5, according to the invention).

The maximum speeds obtained are shown in Table IV.

TABLE IV

| Example | Internal radius of the counter-electrode | Maximum speed |
| --- | --- | --- |
| 12 | 6 mm | 47 meters/minute |
| 13 | 5 mm | 47 meters/minute |
| 14 | 4 mm | 53 meters/minute |

EXAMPLES 15 to 6

The comparison example shown in Table V was carried out with an experimental polyethylene terephthalate polymer:

TABLE V

| Characteristics | Device with counter-electrode | Device with wire by itself |
| --- | --- | --- |
| Diameter of the high-voltage electrode ($\mu$) | 150 | 150 |
| Internal radius of the counter-electrode (mm) | 6.5 | |
| Distance between electrode and casting drum (mm) | 5 | 5 |
| Thickness of the polymer web (kept constant regardless of the speed) ($\mu$) | 120 | 120 |
| Maximum speed (meters/minute) | 69 | 38 |
| Potential of the high-voltage electrode at the maximum speed (high voltage > 0), $V_F$ (kV) | 6.2 | 8.2 |
| Total current $I_f$ at the maximum speed ($\mu$A/cm) | 70 | 13 |

The above examples clearly show that the shape of the uninsulated counter-electrode is predominant. In fact, when using a grounded, cylindrical uninsulated counter-electrode having a diameter which is very much greater than that of the corona wire, results are obtained which are scarcely superior to those obtained with a corona wire by itself. This arrangement of FIG. 4 is that which can result from the teaching of U.S. Pat. 3,820,929 if, in contradiction to the teaching of the said patent, the counter-electrode is connected to ground. On the other hand, Examples 6, 12, 13 and 14 clearly show that the presence of an essentially semi-cylindrical conducting counter-electrode considerably improves the application performance; the limiting speed of application can in fact be increased to 82% of its value (Examples 15 and 16), without these illustrative embodiments implying a limitation. It is also verified that, for a constant corona voltage, it is important to arrange the wire as close as possible to the web leaving the extrusion equipment.

On the other hand, the best results with the process and device according to the invention are obtained when the distance between the wire and the metal drum is equal to the radius of the counter-electrode (Examples 6 and 14). Examples 13 and 14, in particular, show that the invention is not limited only to this arrangement of the electrode and counter-electrode elements, and that variations in their arrangement give results which are nevertheless very superior to those of the prior art.

When the distance between one of the ends of the counter-electrode and the drum is equal to half the distance between the corona wire and the drum, no further appreciable improvement in the speed of application of the film is observed. Furthermore, an adjustment of this kind becomes impossible if the corona wire is arranged very close to the dielectric film.

What is claimed is:

1. A process for electrostatically pinning a dielectric film to an electrically conducting moving surface which is connected to a fixed potential, the film being applied to the moving surface with the aid of a corona electrode consisting of a metal wire fed with direct current which is arranged parallel to the said surface, and a second electrode being arranged near the corona electrode and parallel to the corona electrode, said process comprising the steps of:

providing as the second electrode an uninsulated counter-electrode having a concave face and made of an electrically conducting material, said corona electrode being located between the uninsulated counter electrode and said moving surface;

connecting the counter-electrode to a fixed potential which is approximately equal to the potential of the moving surface; and locating the concave face of the counter-electrode in front of the corona electrode so that an electric current can be established between the corona electrode and the counter-electrode.

2. The process according to claim 1 characterized in that the moving surface is grounded.

3. The process according to claim 1 characterized in that the radius of the counter-electrode is approximately equal to the distance between the corona electrode and the moving surface, the corona electrode being arranged along the axis of the counter-electrode, and wherein the counter-electrode is located at a distance from the moving surface which is greater than or equal to half the distance separating the corona electrode from the moving surface.

4. The process according to claim 1 characterized in that the counter-electrode is arranged symmetrically relative to the plane which is normal to the cooling surface and passes through the corona wire.

5. The process according to claims 1, 2, 3 or 4 characterized in that the counter-electrode is semi-cylindrical and faces the moving surface, in that the moving surface is a cooling surface; and in that the film is a thermoplastic film which is extruded in the form of a molten web onto the cooling surface using a die.

6. The process according to claim 5 characterized in that the counter-electrode is heated at a temperature which is greater than the condensation temperature of the products generated by the extrusion of the plastic, so as to maintain the electric current between the electrode and the counter-electrode.

7. The process according to claim 6 in which a molten web of polyethylene terephthalate is extruded, characterized in that the counter-electrode is heated to a temperature above 315° C.

8. In a device for the application of a dielectric film to an electrically conducting moving surface which is connected to a fixed potential, the film being applied to the moving surface with the aid of a corona electrode consisting of a metal wire which is arranged parallel to the surface and fed with direct current and a second electrode being arranged near the corona electrode and parallel to the latter, the improvement comprising:

the second electrode comprising a counter-electrode which is made of an electrically conducting material and shaped to partially enclose the corona electrode, said counter-electrode being connected to a fixed potential which is approximately equal to the potential of the moving surface, the corona electrode being arranged along the axis of the counter-electrode, said counter-electrode being uninsulated so that an electric current is established between the corona electrode and the counter-electrode.

9. The device according to claim 8 further comprising means for heating the counter-electrode.

10. The device according to claim 8 wherein the counter-electrode has an open face which is orientated toward the moving surface.

11. The device according to claim 8 wherein said counter-electrode is semi-cylindrical.

12. The device according to claim 11 wherein the radius of the said counter-electrode is approximately equal to the distance between the corona electrode and the moving surface.

13. The device according to claims 8 or 9 wherein said counter-electrode has a concave face which is in front of the corona electrode.

14. The device according to claim 8 wherein the counter-electrode is located at a distance from the moving surface which is greater than or equal to half the distance separating the corona electrode and the moving surface.

15. The device according to claims 11 or 12 wherein the radius of the counter-electrode is between 3 and 15 mm.

* * * * *